United States Patent [19]

Nojiri et al.

[11] Patent Number: 5,271,790
[45] Date of Patent: Dec. 21, 1993

[54] APPARATUS AND METHOD OF MANUFACTURE FOR A GREEN TIRE

[75] Inventors: Yasushi Nojiri; Toru Nagahata, both of Kobe, Japan

[73] Assignee: Sumitomo Rubber Industries Limited, Hyogo, Japan

[21] Appl. No.: 774,813

[22] Filed: Oct. 11, 1991

[30] Foreign Application Priority Data

| Oct. 11, 1990 | [JP] | Japan | 2-274008 |
| Oct. 11, 1990 | [JP] | Japan | 2-274009 |
| Nov. 30, 1990 | [JP] | Japan | 2-338911 |

[51] Int. Cl.$^5$ .................................. B29D 30/08
[52] U.S. Cl. .......................... 156/405.1; 156/406.4
[58] Field of Search ............ 156/405.1, 406.4, 157, 156/507, 521; 83/136, 26, 155.1, 27, 156, 158, 269, 279, 280; 198/781, 575

[56] References Cited

U.S. PATENT DOCUMENTS

| 3,130,100 | 4/1964 | Hasselquist | 156/157 |
| 3,407,106 | 10/1968 | Barefoot | 156/406.4 |
| 3,413,174 | 10/1968 | Porter | 156/405.1 |
| 3,444,030 | 5/1969 | Henley | 156/507 |
| 3,898,116 | 8/1975 | Katagiri et al. | 156/134 |
| 4,006,816 | 2/1977 | Werntz | 198/781 |
| 4,333,788 | 6/1982 | Klose | |
| 4,457,802 | 7/1984 | Yanagihara et al. | 156/406 |
| 4,769,104 | 9/1988 | Okuyama et al. | 156/406.4 |
| 4,892,609 | 1/1990 | Nakanome et al. | 156/406.4 |

FOREIGN PATENT DOCUMENTS 2639689 9/1978 Fed. Rep. of Germany .
2743502 5/1979 Fed. Rep. of Germany .
53-24463 7/1978 Japan .

Primary Examiner—Michael W. Ball
Assistant Examiner—Richard Crispino
Attorney, Agent, or Firm—Birch, Stewart, Kolasch & Birch

[57] ABSTRACT

The green tire manufacturing apparatus includes an unwinding apparatus for unwinding a tire component in web form wound on a reel; a transfer apparatus for transferring the unwound tire component longitudinally through a first conveyor located upstream and a second conveyor located downstream, wherein the first and the second conveyors are drivable independently; a cutter device located on the first conveyor and intended to cut the tire component at a predetermined angle slanted against the transferring direction; a separating apparatus located between the first and second conveyors and intended to separate the downstream cut portion of the tire component from the upstream subsequent tire component portions; a guide pan apparatus for guiding the cut component portion with giving widthwise positioning thereof; and a green tire building drum on which the tire component cut in a predetermined length is supplied from the guide pan apparatus and attached thereon.

11 Claims, 11 Drawing Sheets

APPARATUS AND METHOD OF MANUFACTURE FOR A GREEN TIRE

BACKGROUND OF THE INVENTION

1. Field of the Invention

This invention relates to an apparatus and method of manufacture for a green tire and in particular for supplying a tire component, for example, a reinforced fabric material usually of steel cord, such as is used for a tire carcass or a steel breaker which is fed as a predetermined cut length to a green tire building drum. This operation involves cutting, separating the cut component from the following continuous portions and guiding the cut component with positioning thereof.

2. Description of Related Art

Generally, green tires are manufactured by several steps. A first step is to build or assemble a cylindrical tire carcass by fitting a pair of beads one over either end of the cylindrical carcass, folding back the two ends of the cylinder around the beads and attaching two sidewalls to form a green carcass. Secondly a belt reinforcement is formed and then fitted around the green carcass which is shaped up into a toroid and bonding the belt to the green carcass. Finally tread is fitted. In the belt forming process, tire components or tire materials (for example, tow plies of steel breaker, a reinforcing band and a rubber tread strip) are supplied in turn in a direction perpendicular to the axis of a belt building drum to a belt assembly stage, the components being in order of winding and fitting to the drum to form an annual belt/tread assembly.

Each breaker as mentioned comprises sheets of fabric in the shape of a long belt or sheet in which many parallel steel cords are incorporated. The cords are at an acute angle to the longitudinal direction, and are embedded in rubber.

A conventionally known process for supplying this breaker to a belt building drum comprises unwinding the breaker from a reel into a transfer apparatus with guides and control to avoid a snaking feed, placing the breaker into a place for measurement of its length and cutting it, and after cutting off the required length, sending the cut breaker onto a guide pan for positioning and then supplying the cut breaker to the belt building drum in a direction perpendicular to the drum axis, and fitting it on to the drum. (For example, Japanese Examined Patent Publication SHO 53-24483).

An apparatus in which this process is put into execution is disclosed in the same Japanese Examined Patent Publication Sho. 53-24483. The apparatus comprises unwinding means for unwinding the breaker from a reel; a guide mechanism for correcting snaky feed and means for determining the breaker fabric position; a conveyor for transferring the breaker; a cutter provided at an intermediate position on the conveyor to cut the fabric to the predetermined length; means for positioning the cut breaker lengths; guide pan conveyors for the breaker lengths set up to have upper, middle, and lower levels (guide pan) for supplying in a direction perpendicular to a drum axis the cut breakers to a belt building drum and for attaching them to the assembly on a belt building drum.

The three stage guide pan conveyor for supplying the breakers to the drum has each level independently driven and includes frames for supporting the guide pans so that they may be moved towards and away from the drum by pivoting in a vertical direction.

The breaker fabric has steel cords embedded at an acute angle to the longitudinal direction and the breaker is then cut parallel to the steel cords. To separate the cut breaker length from the length of subsequent breaker material, the conveyor on which the cut breaker lies is operated so that its downstream sector is driven and its upstream sector on which the top portion of the subsequent long length breaker is not driven.

In this position, the breaker is already cut at the acute angle and thereby a rear triangular portion (this triangular portion is produced by the slant cut) of the cut breaker lies on the non-driven upstream sector. As a result, when the downstream conveyor sector is driven to convey the cut breaker, the conveyor sector on which the rear triangular portion lies is not put into drive, movement of the breaker by the downstream sector casuses slipping and resultant sideways displacement and in many instances irregular elongation of the rear triangular portion.

Further, in such a conventional conveyor the guide pan apparatus is complex in structure and needs a large area to include a standby position and is expensive to maintain. Such conveyors use guide rollers to accurately place the breakers in alignment with the center of the drum and such alignment devices are not very effective.

Still further, the drum for attachment of the breakers has conventionally not been provided with a means for positioning the breaker with accuracy, which has caused difficulty in supplying and attaching the breakers accurately onto the drum, and all these problems require complex structures and frequent adjustment in the building operation.

SUMMARY OF THE INVENTION

It is an object of the present invention to address the above problems and to provide a green tire manufacturing apparatus which includes a device for separating a tire component cut to a predetermined length from a subsequent tire component portion without causing elongation or deformation and further without positional offset, and a guide pan apparatus with a simple structure and effective positioning to align the cut breakers accurately and to accurately guide them to the building drum.

SUMMARY OF THE INVENTION

This invention is intened, in summary, to offer a green tire manufacturing apparatus which includes a device for separating a tire component cut in a predetermined length from subsequent tire component portions without causing elongation or deformation and further without positional offset, and a guide pan apparatus with simple structure and easy positioning to align the cut breakers accurately and to guide them to perform the accurate attachment, wherein the guide pan apparatus can serve to meet with both upper and lower ply transfer lanes.

A green tire manufacturing apparatus of this invention is defined, in summary, as follows:

an unwinding means for unwinding a tire component in web form wound on a reel;

a transfer means for transferring the unwound tire component longitudinally thereof, the transfer means comprises a first conveyor disposed upstream of the transferring direction and a second conveyor disposed downstream of the same, the first and second conveyors being drivable independently;

a cutter means, disposed on the first conveyor, for cutting the tire component at a predetermined angle slanted against the transferring direction; a separating means, disposed between the first and second conveyors, for separating a portion of the tire component cut by the cutter means to have a predetermined length and lying downstream, from subsequent portions of the tire component lying upstream;

a guide pan means for guiding downstream the portion of the tire component cut in a predetermined length and providing widthwise positioning with the same; and a green tire building means which comprises a drum for receiving the tire component as mentioned from the guide pan means and for winding the same on the drum.

Therein, the separating means comprises an upstream conveyor sector and a downstream conveyor sector, a conveyor in the upstream sector and a conveyor in the downstream sector being defined by an intermediate line slanted against the transferring direction, the intermediate line being substantially parallel to the cutting line by the cutting device.

The conveyors of the upstream and downstream sectors of the separating means include many rollers having long/short various lengths and being rotatably supported and disposed widthwise on two opposite sides with respect to the slanted line.

Of the upstream and downstream conveyor sectors of the separating means, rollers of one sector are of drive rotation and rollers of the other sector are of free rotation.

Rollers of the upstream and downstream conveyor sectors may be of free rotation.

Preferably the rollers of the upstream conveyor sector of the separating means are of drive rotation in synchronism with the first conveyor as mentioned, and the rollers of the downstream conveyor sector are of free rotation.

Each roller of the upstream conveyor sector and each roller of the downstream conveyor sector have a common core shaft, and each pair of rollers of the upstream and downstream sectors is defined by sleeves mounted over the common core shaft.

The roller sleeves of the upstream conveyor sector are secured to the common core shafts and the roller sleeves of the downstream conveyor sector are loosely mounted over the common core shafts, and the common core shafts are drive-connected to the first conveyor of the transfer means a Preferably, the roller sleeves of the upstream conveyor sector and the roller sleeves of the downstream conveyor sector have different shares in length respectively on the common core shafts, wherein the difference in share between the upstream roller sleeves and the downstream roller sleeves changes gradually along the transferring direction.

Therein, the guide pan means comprises a conveyor for transferring a tire component, said conveyor being provided with guide members which are disposed at two opposite sides on the conveyor, wherein the two opposite guide members are adapted to come closer and move away from each other and thereby to guide two sides of the tire component body under transferring.

In the guide pan means, omni rollers are arranged to define a working conveying surface whereon the tire component is transferred.

In front of the guide members, movable sub-guide members are disposed, wherein the sub-guide members are adapted to move laterally such that the sub-guide members are retreated from each other, on passing of an acute front portion of the tire component, to avoid contact to sides thereof, and such that the sub-guide members are positionally adjusted with respect to each other to guide the tire component by contacting sides thereof subsequent to passing of the acute front portion.

Therein, the unwinding means comprises a plurality of unwinding apparatus; the transfer means is structured vertically to have a plurality of processing levels in response to the number of the unwinding apparatus; the guide pan means is adapted at least to be vertically mobile and/or vertically pivotable;

the guide pan means is provided with a rear end adapted to connect/disconnect to a front end of a second conveyor provided at each level of a vertically structured transfer means, and the guide pan means is provided with a front end disposed adjacent to the green tire building drum.

The process aspect of this invention includes the steps of:

supplying a tire component in web form unwound from a reel to a transfer apparatus;

cutting, on the transfer apparatus, the tire component at a point of a predetermined length backward from a front end thereof at a slant against transferring direction;

separating the tire component cut in the predetermined length from subsequent tire component portions in a separating apparatus and;

supplying the separated tire component to a guide pan apparatus, and providing thereof with widthwise positioning, and supplying to a green tire building drum for attachment thereof.

According to this invention, a tire component cut by the cutter device in a predetermined length is transferred by drive of the first and second conveyors together with subsequent tire component portions, and when the cut face comes to a central portion of the separating means, drive of the first conveyor and rollers of the separating apparatus is stopped and the second conveyor is only driven, thereby the breaker cut in a predetermined length is separated from the subsequent portions.

At this moment, rollers on which the rear triangular portion of the cut breaker lies are of free rotation, thereby the rear triangular portion as mentioned is permitted to proceed without slipping. As a result, this rear triangular portion is transferred smoothly without any elongation, deformation or any positional offset.

Then, the second conveyor and the roller conveyor of the guide pan apparatus are put into drive so that the cut breaker is stopped at a determined place on the guide pan apparatus. There, by action of the means for positioning act of the guide members, the cut breaker is aligned relative to the center of the building drum with accuracy, and in turn, by start of drive of the roller conveyor of the guide pan apparatus, the cut breaker is supplied on the drum and wound therearound.

Therein, the movable sub-guide members are somewhat retreated after the job of positioning and are again advanced when the front triangular portion of the cut breaker contacts the building drum, by such actions of causing the sub-guide members to serve to the positioning, the front triangular portions of the breaker avoid deformation and, in return, can be supplied with more accuracy.

By causing the guide pan to vertically shift and/or pivot, connection/disconnection of the guide pan apparatus to the vertically pluralized transfer apparatus and a move to the standby position thereof are permitted, wherein the apparatus is featured in simple structure and less space necessary for the apparatus, and easy effort in adjustment thereof. Hence, a more compact device and less cost maintenance are achieved.

This invention thus allows separation of a cut tire component from subsequent tire component portions without slipping, and allows transferring with the cut dimension accurately kept and without deformation and positional offset. As a result, the tire quality is improved.

Further, enablement of widthwise alignment by the guide pan apparatus permits more correct positioning onto the building drum.

Further, this invention process allows retention of accuracy in cutting a tire component and also supply and attachment to the building drum with accuracy, hence improvement in the tire quality.

DETAILED DESCRIPTION OF THE PREFERRED EMBODIMENT(S)

Figure 1:
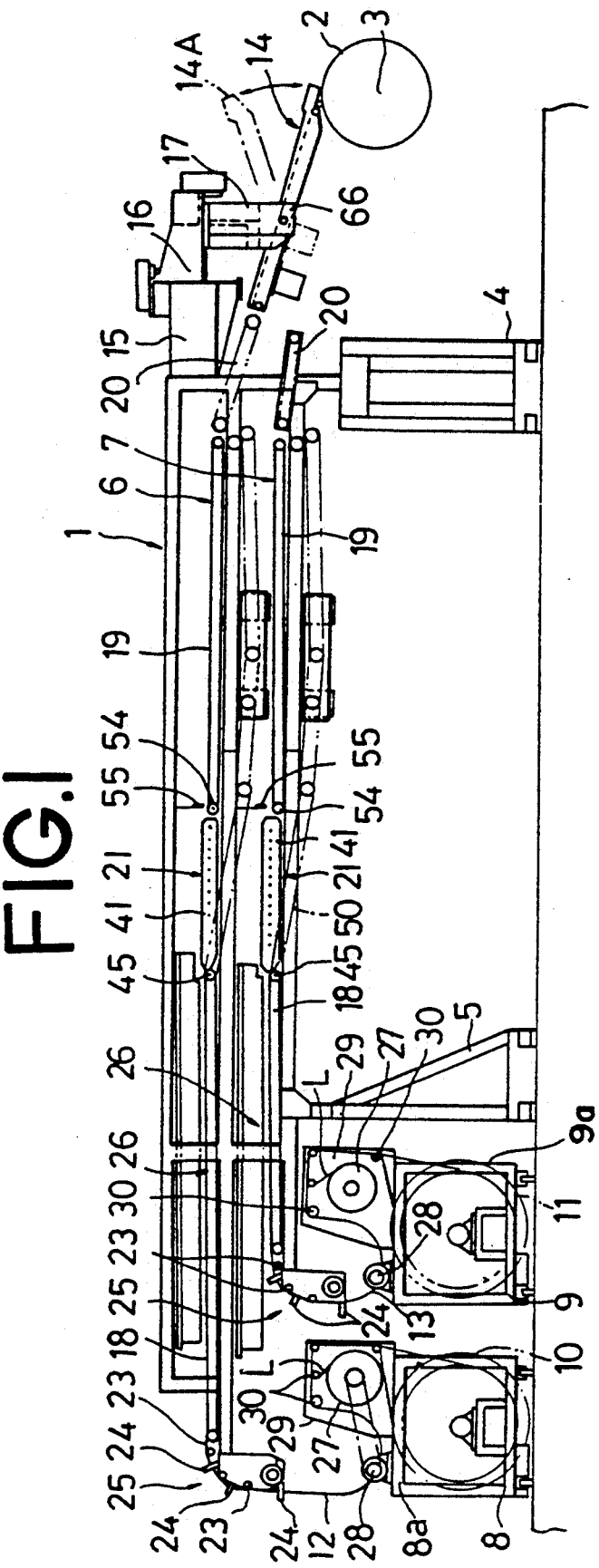
FIG. 1 shows a whole side view of an apparatus according to this invention.
Figure 2:
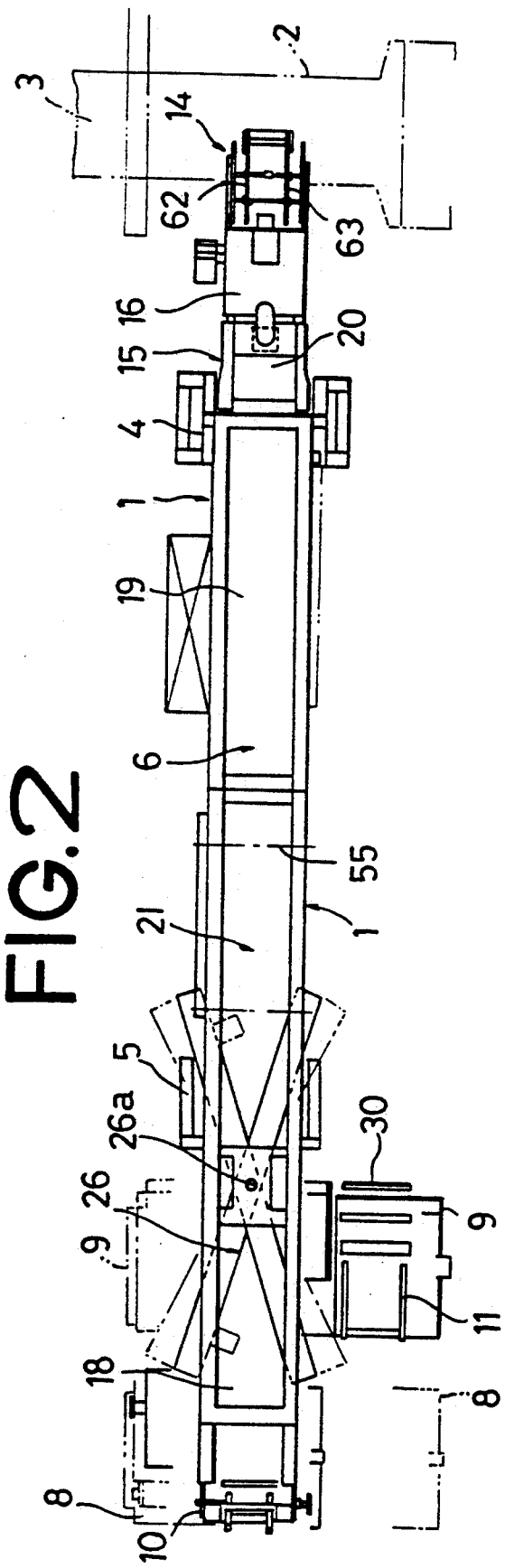
FIG. 2 shows a plan view of FIG. 1.

In FIGS. 1 and 2 reference numeral 1 indicates a main frame structure of the apparatus. In use this frame structure 1 is set up, at the rear of a drum for building a tire belt, with the aid of front and rear legs 4, 5 so that its longitudinal axis is at right angles to the drum axis 3.

(Here, right is to the front and downstream, and left is to the rear and upstream). The main frame 1 supports two apparatus 6, 7 for transferring breakers on upper and lower levels or lines.

In the area to the rear and downward of the main frame 1, two units 8, 9 comprising two removable carriages 8a and 9a are positioned in series for unwinding or supplying breaker material. On the carriages 8a, 9a the breaker material 12, 13 is mounted or wound on reels 10, 11 with a separating liner L so that the breakers 12, 13 can be unwound from the reels 10 and 11.

At the front end of the main frame structure 1, a guide pan apparatus 14 is arranged to be vertically pivotable with the aid of a mounting frame 15, a vertically mobile frame 16, and a front/rear mobile frame 17.

Figure 3:
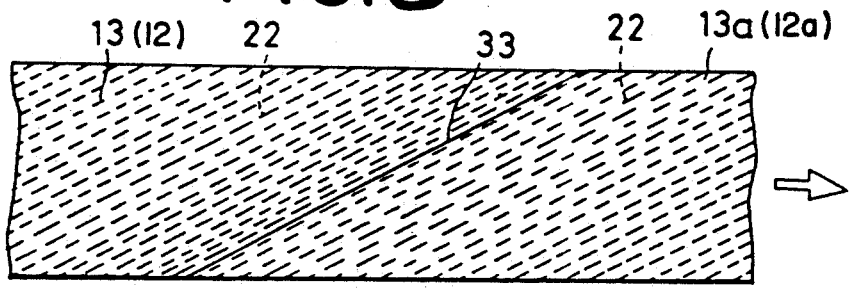
FIG. 3 shows a plan view of a material for manufacturing tires having steel cords incorporated.
Figure 4:
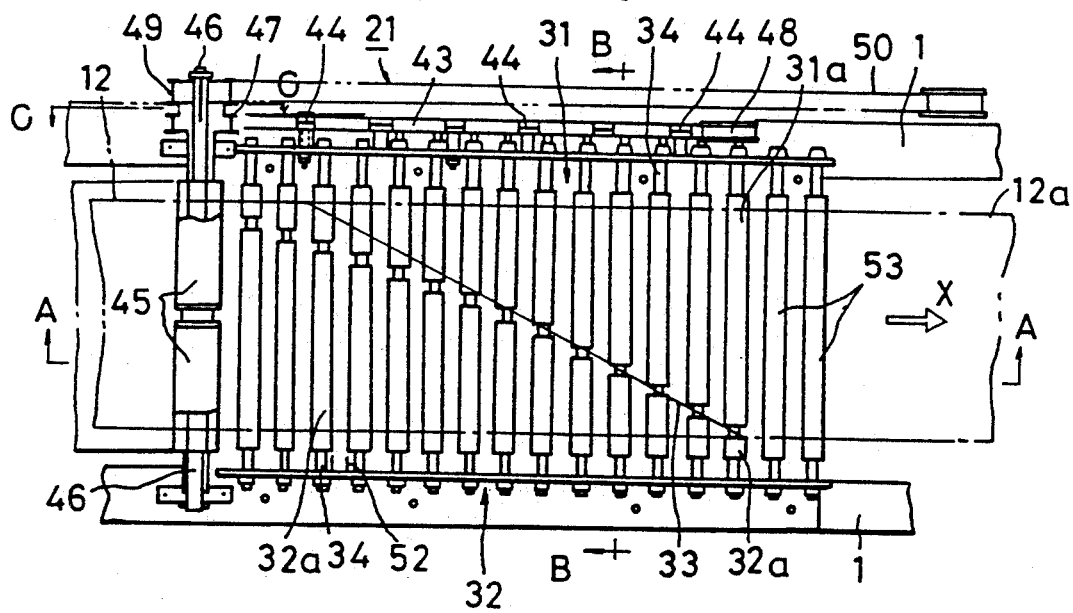
FIG. 4 shows an enlarged plan view of a device for separating the material on an upper process line.
Figure 5:
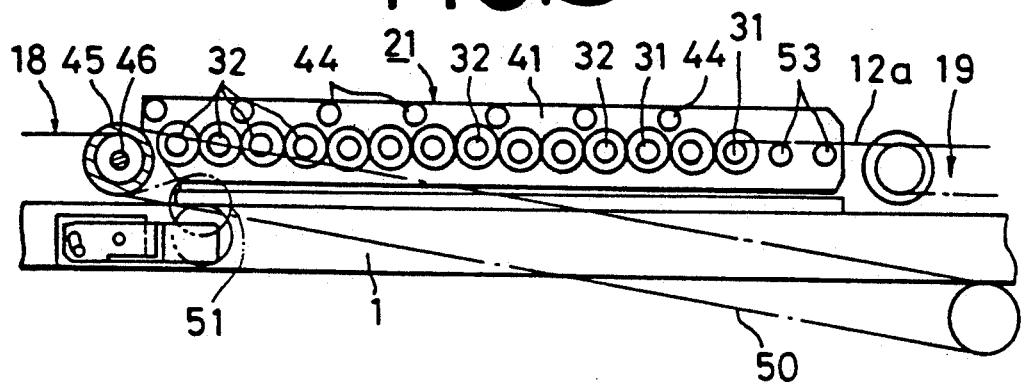
FIG. 5 shows a sectional view along the line A—A in FIG. 4.

The upper and lower breaker transfer apparatus 6, 7 are each of much the same structure, wherein a first conveyor 18, a second conveyor 19, and a transhipping belt conveyor 20 are included in the longitudinal direction of transfer in the above-mentioned order. Between the first conveyor 18 and the second conveyor 19 a separating apparatus 21 is positioned comprising a roller conveyor for separating or removing breakers cut to a predetermined length 12a, 13a (FIGS. 3 and 4). (The breakers having a determined cut length 12a, 13a indicate the breakers that lie downstream of the cutter device 26 and hence are already cut).

The first and second conveyors 18, 19 are belt conveyors, wherein although not shown in the drawings, permanent magnets are embedded in a belt supporting panel at a predetermined distance so that they attract through the belt the steel cords 22 included in the breakers 12, 13 (see FIG. 3) so that the breakers 12, 13 can be transferred without making a snaky or meandering path.

The transhipping belt conveyor 20 is set, in front of or downstream of the second conveyor 19, positioned such that the working conveying surface is located in a plane inclined tangentially and normally to the belt building drum 2 and, to the front end of or downstream of the conveyor 20. The front end of the guide pan apparatus 14 is able to come close to or move away from the drum, and in a belt supporting panel, permanent magnets are embedded at a predetermined distance to prevent the cut breaker from making a meandering run.

At the rear end or starting end of the first conveyor 18 set is a means 25 for determining the position of the breaker comprising omni-rollers 23 and side guide rollers 24, which are intended so that the breakers 12, 13 can be guided with accuracy to take suitable positions on the first conveyor 18. On the upper and lower first conveyors 18 are mounted a cutter device 26 for cutting the breakers into the predetermined lengths. The cutter device 26 is provided with a running track or lane (panel anvil) adjustable to give any desired cutting angle. Also the cutter devices 26 on the upper and lower levels are disposed with respect to each other so that, looked at in plan view, they have an opposite slanting or bias cutting angle or to be across from each other (see FIG. 2). These cutter devices are intended to cut the breakers along a slanted cut line 33 (see FIGS. 3 and 4). The cutter devices 26 themselves are conventional and hence the description thereof is abbreviated, and in this description, the already cut breakers lying downstream of the devices are noted the breakers having a determined length 12a, 13a.

The two unwinding apparatus 8, 9 are much the same and include on the carriages 8a, 9a a winding roll 27 for the liner L and a drive motor 28 therefor. Roll supporting panels 29 are mounted on the carriages 8a, 9a and are provided with plural guide rollers 30, and the carriages 8a, 9a are movable sidewards of the main frame structure 1.

The separating apparatus 21, as shown in FIGS. 4 to 8, comprises an upstream conveying sector 32 and a downstream conveying sector 31. All the rollers are arranged laterally side by side, but most rollers have two portions, an upstream portion 38a and a downstream portion 31a, to provide a slant cut line 33. Specifically, there are provided many rollers having various long to short lengths which are arranged on two laterally opposite sides of the slant line 33 which is angled to the direction of transferring the breakers.

Figure 6:
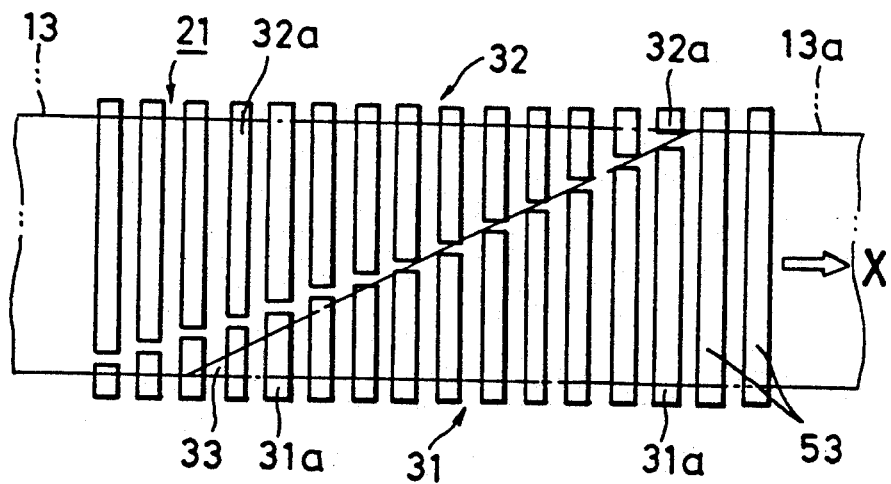
FIG. 6 shows a plan view of a device for separating the material on a lower process line, especially to show the roller arrangement.

All rollers are arranged parallel to the axis 3 of the belt building drum 2, and as shown in FIG. 4, in the separating apparatus 21 on the upper level, the rollers 31a as seen close to the mark X to indicate the direction for transferring the breakers (see FIG. 4, right end) or in the top left region, are freely rotatable and the rollers 32a as seen in the bottom right region are driven. Then, as shown in FIG. 6, in the separating apparatus 21 on the lower level, the rollers 32a as seen in the top right region are driven, and the rollers 31a as seen in the lower left region are of free rotation.

Figure 7:
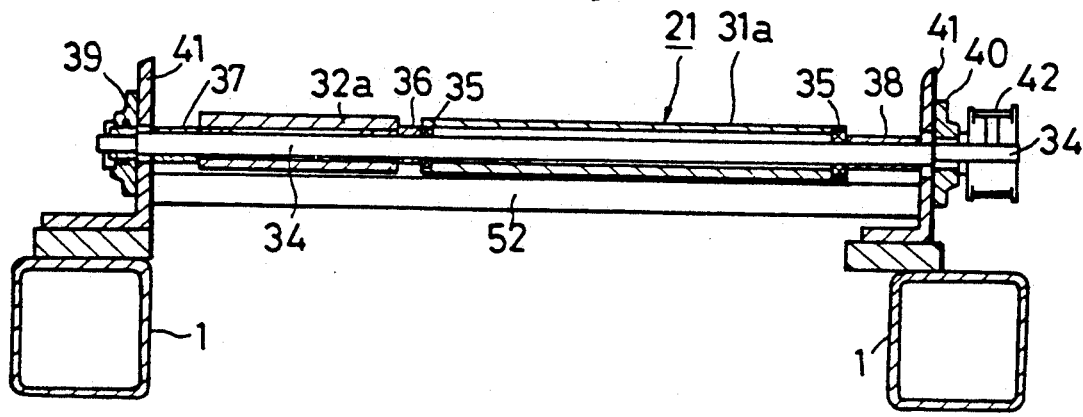
FIG. 7 shows an enlarged sectional view along the line B—B in FIG. 4.

Specifically, each separating roller 31a, 32a, has, as shown in FIG. 7, a core shaft of a uniform diameter and two roller portions 31a, 32a are mounted over the common core shaft 34, wherein one roller 31a is made freely rotatable by bearings 35 and the other roller 32a is secured to the shaft 34 and thus can be driven. In addition, locating collars 36, 37, 38 are fitted over an intermediate portion of the shaft 34 and the two opposite ends thereof.

Further, two ends of respective common shafts 34 are mounted, with the aid of bearings 39, 40 to be freely rotatable in L-shaped support frames 41 which are secured to the main frame 1. At the ends of the separating rollers 31a, toothed pulleys 42 are mounted.

Figure 8:
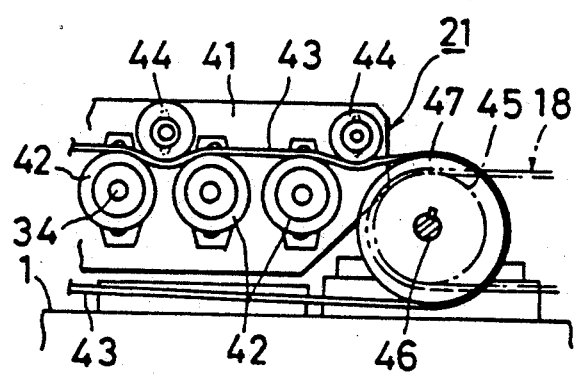
FIG. 8 shows an enlarged view along the line C—C in FIG. 4.
Figure 9:
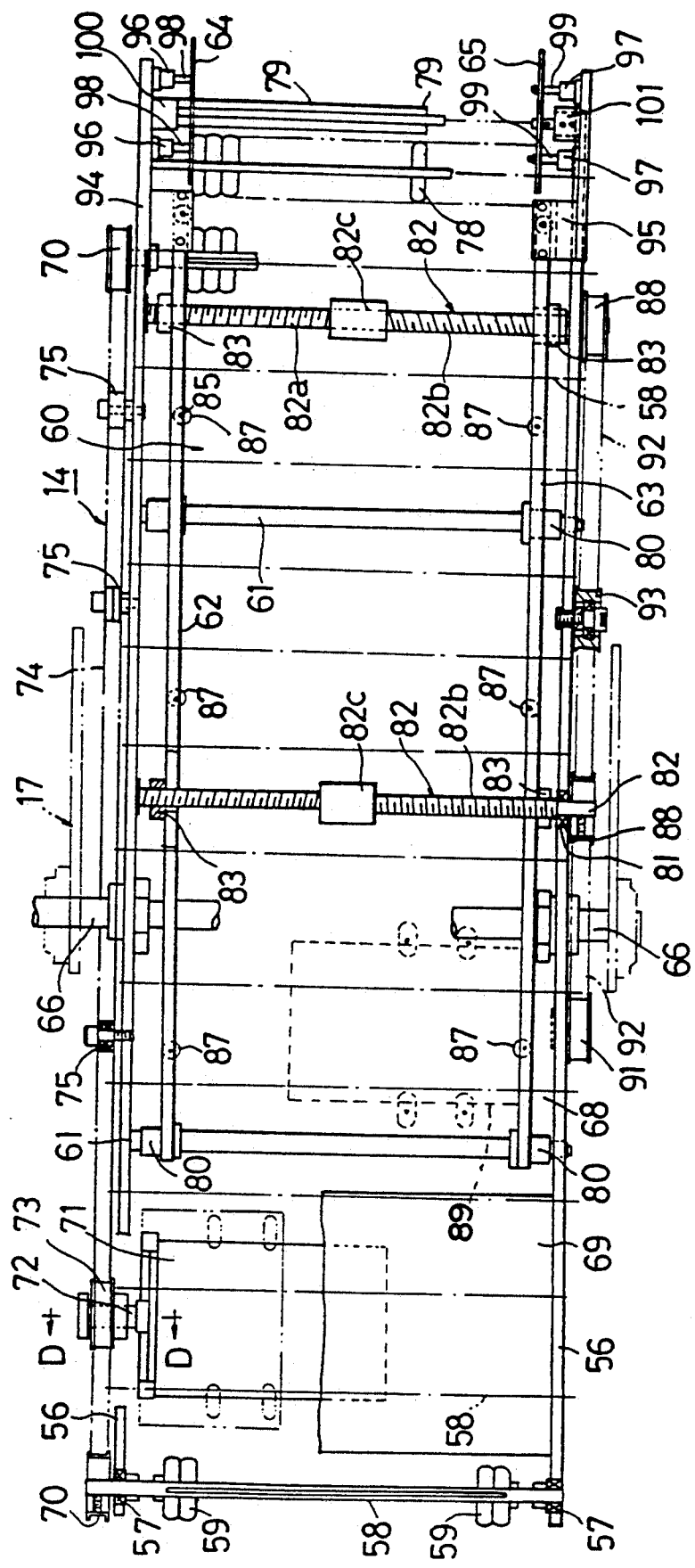
FIG. 9 shows an enlarged plan view of the guide pan.
Figure 10:
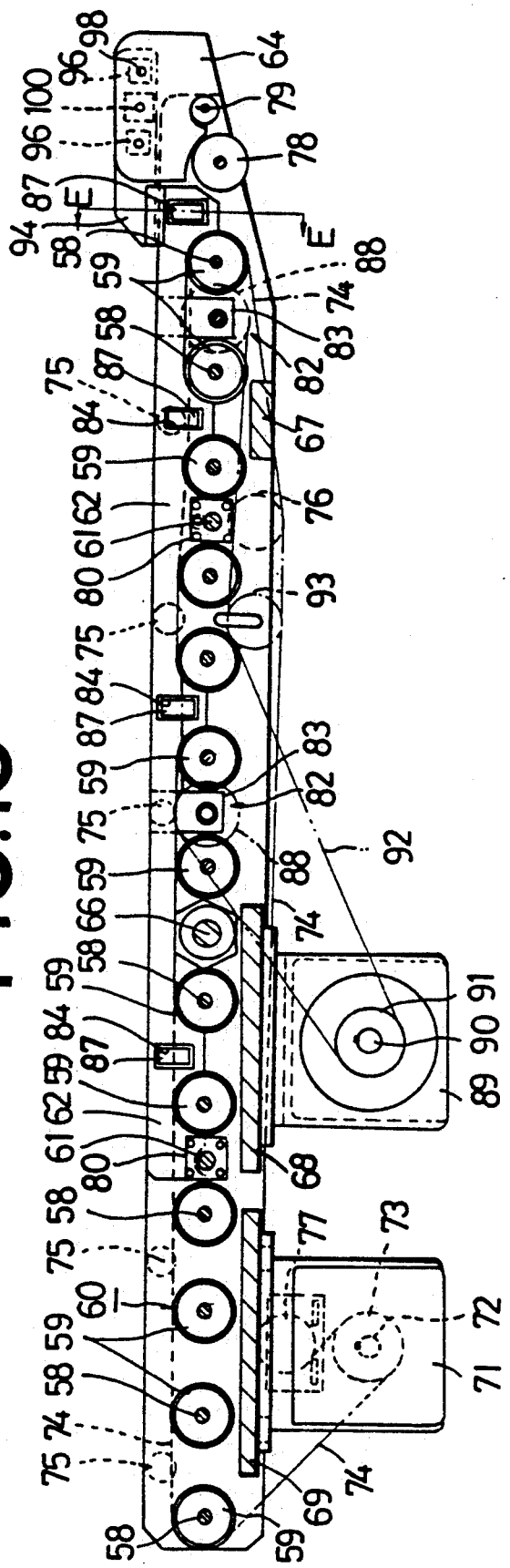
FIG. 10 shows a side view with a partial break of the guide pan.
Figure 11:
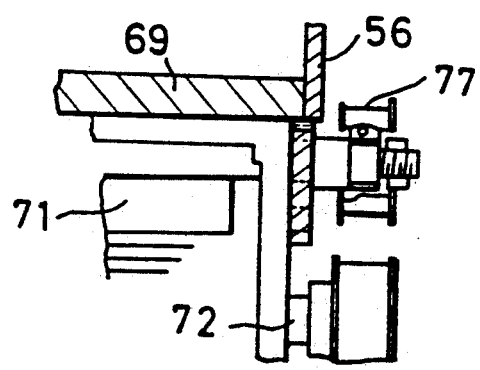
FIG. 11 shows a sectional view along the line D—D in FIG. 9.
Figure 12:
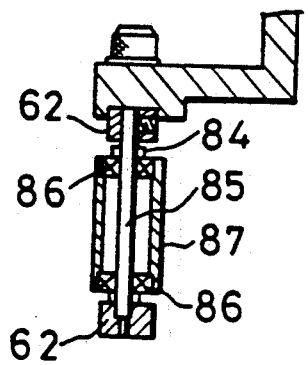
FIG. 12 shows an enlarged sectional view along the line E—E in FIG. 10.

As shown in FIG. 8, above the toothed pulleys 42, a timing belt 43 is pressed by press rollers 44 which are mounted on the frame 41 to be freely rotatably so that timing is provided. The timing belt 43 is positioned over a toothed pulley 47 which is secured to an end of a shaft 46 for a belt roller 45 located at the front end of the first conveyor 18 and also over a freely rotatable toothed pulley 48 (see FIG. 4) at the front so that the timing belt 43 will start/stop at the same time as the first conveyor 18.

At the outer end of the toothed pulley 47 of the belt roller shaft 46, a toothed pulley 49 (see FIG. 4) is mounted, over which a drive belt 50 (see FIGS. 4 and 5) for driving the first conveyor 18 is placed.

Numeral 51 (see FIG. 5) indicates a tension roller, 52 (see FIGS. 4 and 7) indicates a member connecting the support frames, 53 (see FIGS. 4 and 6) indicates a free roller, 54 (see FIG. 1) indicates a belt roller placed at the rear end of the second conveyor 19. and above the belt roller 54 is set a photo-sensor 55 (photoelectric cell) which provides one component of a means for determining the cutting position of the breakers.

The means for determining the cutting position consists of the photo-sensor 55 as mentioned and a rotary encoder (not shown) provided on the drive sector of the first conveyor 18. Therein, when a triangular front edge of the breaker 12, 13 is detected by the photo-sensor 55, measurement of the transfer distance by the rotary encoder starts, and when the transfer reaches a length which is obtained by subtracting a distance between the center 26a (see FIG. 1) of the breaker cutter 26 and the photo-sensor 55 from the required length to encircle the belt building drum 2, the first conveyor 18, second conveyor 19, and separating rollers 32a are stopped. As an alternative, the separating rollers 31a, 32a may be all made freely rotatable.

The guide pan apparatus 14, as shown in FIGS. 9 to 12, is provided with a roller conveyor 60 which comprises two opposite frames 56, rollers shafts 58 borne by bearings 57 between the two parallel frames, and omni rollers 59 secured to each shaft 58. Further means is provided for controlling the width of a passing breaker piece. This means comprises guide members 62, 63 which are disposed longitudinally within the two frames 56, 56 and spaced apart to define two opposite walls. Therefor the guides 82, 83 are secured to the guide rods 61. This is, the means for causing the guides 62, 63 to come closer together and apart comprises a plurality of guide rods 61, the ends of which are secured to the frame 56, 56. Also the guides 62, 63 are positioned above the omni rollers 59. At the front end of or downstream of the guide members 62, 63 are provided sub-guide members 64, 65 which are further movable in relation to the guides 62, 63.

On the two opposite frames 56, specifically at a place somewhat backward from a central portion, a pivotal shaft 66 is secured, and the frames 56 are set vertically pivotable by a pivot shaft 66 which is mounted at the lower end of the front/rear mobile frame 17. The two opposite frames 56 are connected by interconnecting members 67, 68, 69.

At the left outer end of each roller shaft 58, a toothed pulley 70 is secured. Under the interconnecting member 69 set is a servo motor 71 with an output shaft conveying a toothed pulley 73, and a drive belt 74 is placed over the toothed pulley 73, and other toothed pulleys 70 secured to each shaft 58, by which arrangement all the omni rollers 59 are driven in unison. Therein, on the left frame 56, press rollers 75 to press the drive belt are set to be of free rotation with a space adequate to do so. Finally toothed pulleys 76, 77 are provided for tensioning the device belt 74.

In the span at the front end of the two opposite frame 56 are a freely rotatable omni roller 78 and a conveyor roller 79.

The guide members 62, 63 are each supported by the guide rods 61 with the aid of a linear bearing 80, and these guides 62, 63 are connected to the two opposite frames 56 at two points within the frame lateral span, wherein the guide 62, 63 are fitted with nuts 83 which are engaged on two screw shafts 82 which are laterally supported to be freely rotatable in bearings 81. The screw shaft 82 includes two parts coupled by a coupling 82c, wherein the left half is referenced 82a, and the right half is 82b, by rotative actions of 82a and 82b, the distance between the two opposite guides 62, 63 can be changed.

The guide members 62, 63 are provided with vertical rectangular through holes 84, and each hole 84 is provided with a pin 85 having an axis on a line square with a line which connects the centers of the roller shafts 58. A breaker guide roller 87 is mounted around the pin 85 to be freely rotatable in a bearing 86, wherein a plurality of the guide rollers 87 are set so as to project somewhat from the two opposite faces (see FIG. 12).

At an outer end of the right half screw shaft 82b, a toothed pulley 88 is secured, and there is another toothed pulley 91 which is secured to an output shaft 90 of the servo motor 89, and a drive belt 92 is placed over the toothed pulleys 88, 91 so that two screws halves 82a, 82b are rotated in synchronism to increase or decreace the distance between the two guides 62, 63 while keepling the parallel relationship between the two members. A tension pulley 93 is also provided.

The sub-guide members 64, 65 are adapted to move laterally in parallel relative to the guides 62, 63. Specifically, these members 64, 65 are secured to brackets 94, 95 which are also secured to the front upper face of the guide 62, 63, thereby the members 64, 65 are allowed the same movement as the members 62, 63. Further with the aid of guide shoes 96, 97 and guide bars 88, 89, the guides 84, 85 are adapted to make further movements by the action of air cylinders 100, 101. That is, only when the triangular front end of the cut breaker 12a, 13a has passed may the guides 84, 85 come away so that no resistance will be given to the passing breakers to avoid their snaky move.

The means for determining the positions of the breakers of the guide pan apparatus 14 comprises omni rollers 59, guide panels 62, 63 and sub-guide panels 64, 65.

The mounting frame 15 comprises two opposite side plates 102, 102, front end plate 103, an interconnecting member 104 which connects two rear ends of the side plates 102, rear end plate 105 secured to the rear ends of the two side plates 102, and a reinforcing member 105, wherein the rear end plate 105 is secured to the front end of the main frame structure 1.

On the two ends of the front face of the front plate 103 set are guide rails 107, and on the upper face of the frame is mounted a servo motor 108, on a mounting plate 10a, for driving the vertically mobile frame with its output shaft 110 held upwardly and at a central upper portion of the front end plate 103, a screw shaft 111 for vertical drive is set vertical rotatably in a bearing 112.

At the top ends of the screw shaft 111 and of the output shaft 110, toothed pulleys 113, 114 are mounted, and a drive belt 115 is placed over these two pulleys 113, 114. Further at the rear of the two opposite reinforcing members, specifically backward positions therein, bolts 116 for suspending the belt conveyor 20 are set to be vertically adjustable by nuts 117. At the low end of the guide rail 107 set is a stopper 118, and at the right side end of the front end plate 103, a proximity switch 119 for detecting a stop point for the vertical movement is set to be positionally adjustable (the same arrangement as in FIG. 17).

The vertically mobile frame 16 is generally a box having a bottom, and on the rear face of a rear end plate 120 of the vertically mobile frame 16, guide shoes 121 for engaging the guide rails 107 as mentioned above are provided at right, left and upper, lower positions. On the front face of the rear end plate 120, specifically at a central position thereon, a ball nut 122 is mounted, to which nut 122 the screw shaft 111 as mentioned above is engaged to be freely rotatable. At a backward portion of the right side plate 123 set is a kicker 124 for the proximity switch 119 (see FIG. 17).

Further, on the front end plate 125 of the vertically mobile frame 16, a servo motor 126 for driving the front/rear mobile frame 17 to have an output shaft 127 forwarding front, a toothed pulley 128 is mounted on the output shaft 127, and on the bottom plate 129 of the frame 16, specifically on the back side thereof, a pair of parallel guide rails 130 are mounted in a front/rear direction. At a centrally front position of the same back side of the bottom plate 129 set is a bearing 131, by which bearing 131 a screw shaft 132 for driving the front/rear movement is rotatably mounted. At the front end of the screw shaft 132 set is a toothed pulley 133, and a drive belt 134 is placed over the toothed pulleys 133 and 128 as mentioned above.

Figure 17:
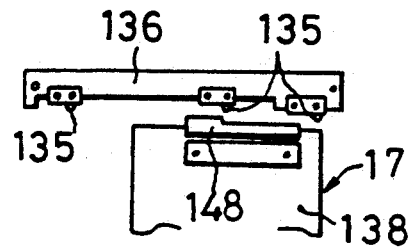
FIG. 17 shows a view as viewed along the arrow line G in FIG. 15.

On the right side plate of the frame 16, specifically at the lower end thereof, as shown in FIG. 17, a proximity switch 135 for detecting the limits of front/rear movement is set on a base plate 136.

The front/rear mobile frame 17 is designed to have the same width or lateral length between the two opposite plates 137, 138 as that of the vertically mobile frame 16. On the top plate 139 of the front/rear mobile frame 17, specifically at the four corners thereof, guide shoes 140 are set to engage the guide rails 130. At a central and front portion of the back side of the same top plate 139 the ball nut 141 is set to be rotatably engaged to the screw shaft 132. At a central and lower portion of the two side panels 137, 138 two ends of the pivotal shaft 66 for the guide pan apparatus 14 are borne rotatably in a bearing 142, and the left end of the pivotal shaft 66 is connected to an output shaft of a worm type speed reducer 143.

Figure 16:
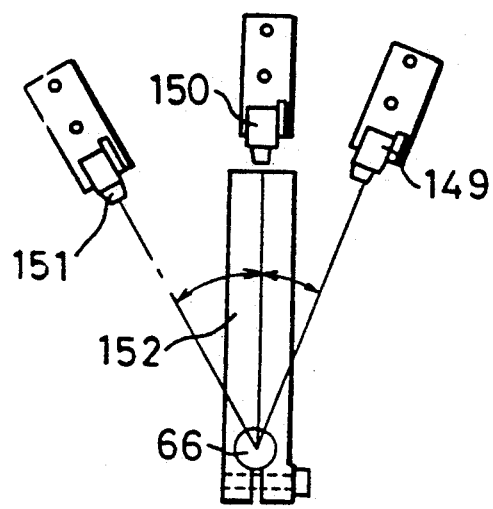
FIG. 16 shows an enlarged view along the line F—F in FIG. 15.

The speed reducer 143 is set on a vertical portion 144a of an L-shaped mounting plate 144 which is fastened on the outside face of the left side plate 137. The reducer 143 is connected, through a coupling 147, to an output shaft 146 of a servo motor 145 for driving the pivotal shaft which is set on a horizontal portion 144b of the mounting plate 144. On the right side plate 138 of the front/rear mobile frame 17, specifically at the top end thereof, a kicker 148 for the proximity switch is set, (see FIG. 17) and at a lower area, as shown in FIG. 16, three proximity switches, upper, lower, and standby positions 149, 150, 151 are set to take positions on the same one circle centring on the pivotal shaft 66. Kickers 152 for the proximity switches 149 to 151 are set on an end of the pivotal shaft 66.

Next, description will proceed to the operation of the apparatus as explained wherein the breakers 12, 13 are supplied thereto and are then passed to the belt building drum 2.

First, in the main frame 1, the side guide rollers 24 of the means for positioning the breakers 25 are positionally adjusted to suit the width of the breaker material to be handled. The guide pan apparatus 14 is prepared by diving the vertically mobile frame 16, the front/rear mobile frame 17, and the pivotable shaft 66, so that its rear end connects to the front end of the upper transhipping conveyor 20, and that, as shown in FIG. 1, the front end of the guide pan 14 comes close to and above the belt building drum. It is assumed here that the positioning means of the guide pan apparatus 14 has already operated the guides 62, 63 so as to take suitable lateral positions by action of the servo motor 89 and the screw shaft 82, and also has operated the sub-guides 64, 65 to take positions in parallel on the same surface continuing to the guides 62, 63.

Then, the first breaker 12 to be sent to the upper line and second breaker 13 to be sent to the lower lines are unwound together with the liner L from the reels 10 and 11 respectively. The liner L is wound up onto the roll 27 for re-use. The breakers 12, 13 proceed by the rotation of the rolls 27 by drive of the motor 28. Unwinding of the breakers 12, 13 is automatic in synchronism with the roll 27.

The first conveyors 18 of the upper and lower transferring apparatus 6, 7 are put into drive, and the front end of the breakers 12, 13 are led to predetermined positions in the cutter devices 26 for cutting the predetermined length, wherein guide actions of the side guide rollers 24 of the positioning means 25, and the omni rollers 23 rotatable front/rear and right/left are involved. Then, the upper and lower first conveyors 18 are stopped and the square front end portion of the breaker is cut slantly by the cutter device 26 to form a triangular front edge. Thus, the upper and lower lines both have finished the job of shaping the breaker web.

The first and second conveyors 18, 19 of the upper transfer line 6 are put into drive to resume the transfer of the breaker 12, and when the triangular front edge of the breaker 12 comes, after passing the separating device 21, to the photoelectric sensor 55 of the means for positioning the determined length, the measurement of the length of the breaker is started by the rotary encoder. When the distance from the center 26a of the cutter device 26 to the front edge of the breaker 12 comes to be the same as the predetermined length of belt building around the drum 2, the conveyors 18, 19 of the upper line 6 are stopped and the cutter device 26 cuts the laid breaker web 12 to the predetermined length, so that one breaker length is cut off.

Therein, the breaker 12 is transferred, on the first and second conveyors 18, 19 held by magnetic attraction by the permanent magnets (not shown) embedded in the belt support panels. Thereby, the transfer has no trouble of snaky movement and the breaker is disposed at the predetermined position, and therefore, accurate cutting is performed.

After the cutting, the first and second conveyors 18, 19 of the upper line 6 are put into drive and the measurement of a length by the rotary encoder resumes, and when the cut line 33 of the breaker 12 comes to the central point of the separating apparatus 21, the first conveyor 18 and the separating rollers 32a which are drive-connected to the first conveyor 18 are stopped and only the second conveyor 19 is driven. By this action, the cut breaker 12a is separated at the cut edge from subsequent breaker material and is transferred further and is then put into a standby status on the second conveyor 19. In the meantime, the separating rollers 31a, that is, the downstream conveyor 31 of the separating apparatus 21, are in free rotation, and thereby the triangular rear portion of the cut breaker 12a transfers without needing to slide, over the rollers 31a avoiding distortion and any dimensional change including elongation or deformation. Thus the size at cutting is maintained.

When the second conveyor 19 resumes moving, the cut breaker 12a passes over this conveyor 19 and the transhipping conveyor 20, and when the front edge of the cut breaker 12a comes to ride on the rear end of the guide pan apparatus 14, the two opposite guides 62, 63 are automatically moved to a suitable separation distance so that the two guides 62, 63 contact with the two sides of the breaker 12a so as to centralize the breaker position with the center of the belt building drum 2.

In turn, the triangular front edge of the cut breaker 12a reaches the front end of the guide 63, when this is detected by the photosensor (not shown) the signal in response to the detection causes the air cylinder at the right side 101 to move the sub-guide at the right side 65 backward so that the cut breaker 12a does not contact it. Thereby any deformation at the front portion of the cut breaker is avoided.

When the front portion of the cut breaker 12a contacts the rotating belt building drum 2 and starts being wound therearound the sub-guide 65 moves forward to contact the side portions of the breaker 12a for assisting an adequate positioning on the drum 2.

Having finished the work of supplying and attaching the first component of the breaker 12a onto the rotating drum 2, the guides 62, 63 of the guide pan apparatus 14 are retreated and put into a standby position to wait for the next cut breaker 13a.

At the same time, the vertically mobile frame 16 comes down to a predetermined position by rotation of the screw shaft 111 caused by the servo motor 108. In the meantime, the front/rear mobile frame 17 moves backwards by rotation of the screw shaft 132 caused by the servo motor 126, and the pivotal shaft 66 of the guide pan apparatus 14 is put into a pivotal act by the servo motor 145 and stops at a position where the rear end of the guide pan apparatus 14 meets the front end of the transhipping conveyor 20.

These operations take place simultaneously and, when the positional connection between the guide pan 14 and the conveyor 20 is finished, the conveyor roller 79 located at the front end of the guide pan apparatus 14 approaches the belt building drum 2 and the upper face of the roller conveyor 60 formed on the guide pan apparatus 14 is positioned on a tangential line to the drum 2.

Thus, machinery preparation for the second breaker or breaker to go through the lower line of the transfer apparatus 7 is finished. Then, the second breaker 13 is moved from the place of the cutter device 20 on the lower line by drive of the first and second conveyors 18, 19 of the transfer apparatus 7. Then, the breaker 13 is cut into a predetermined length and the cut breaker component 13 is separated by the separating means 21, and the separated breaker 13a is put into standby on the second conveyor 19, and then transferred to the guide pan apparatus 14 and positioning action is provided thereon. In turn the breaker 13a is supplied to the belt building drum 2 and is wound therearound.

Therein, in the case of the breaker 13a, the triangular front edge comes to be the left side as shown in FIGS. 3 and 6, the sub-guide at left side 84 is put into action.

Figure 13:
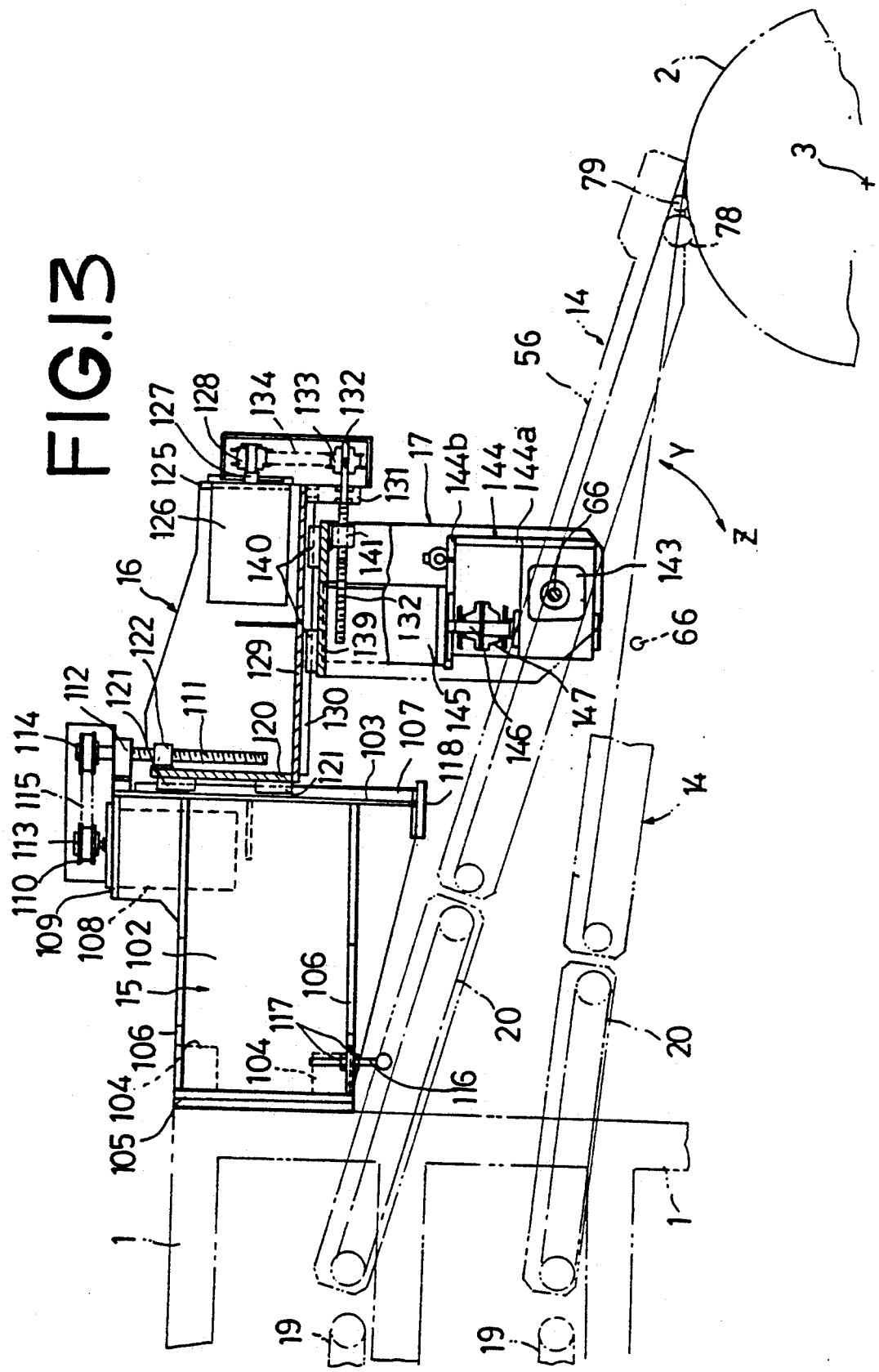
FIG. 13 shows an enlarged side view with a partial break of the structure to support the guide pan.
Figure 14:
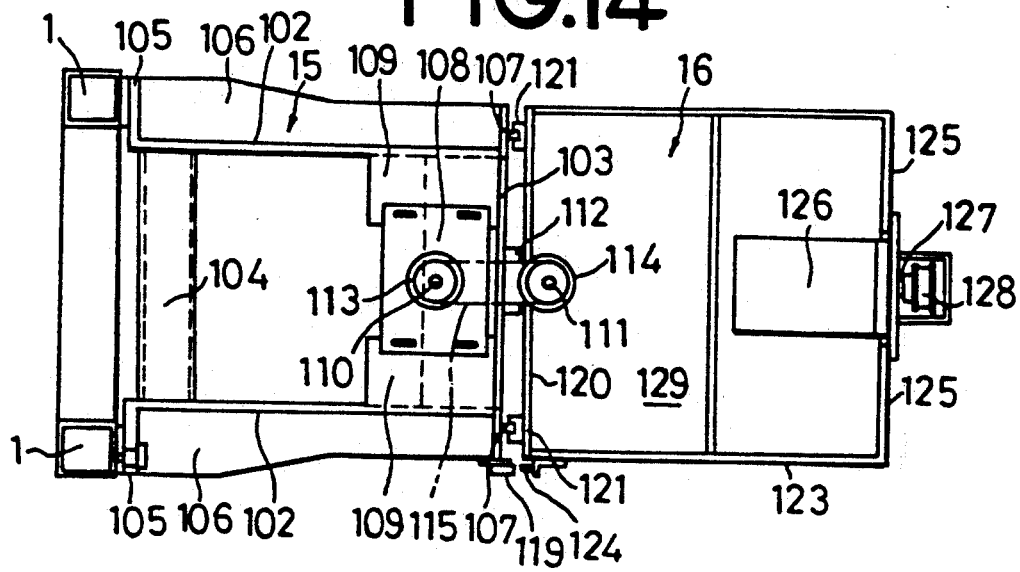
FIG. 14 shows a plan view of the structure shown by FIG. 13.
Figure 15:
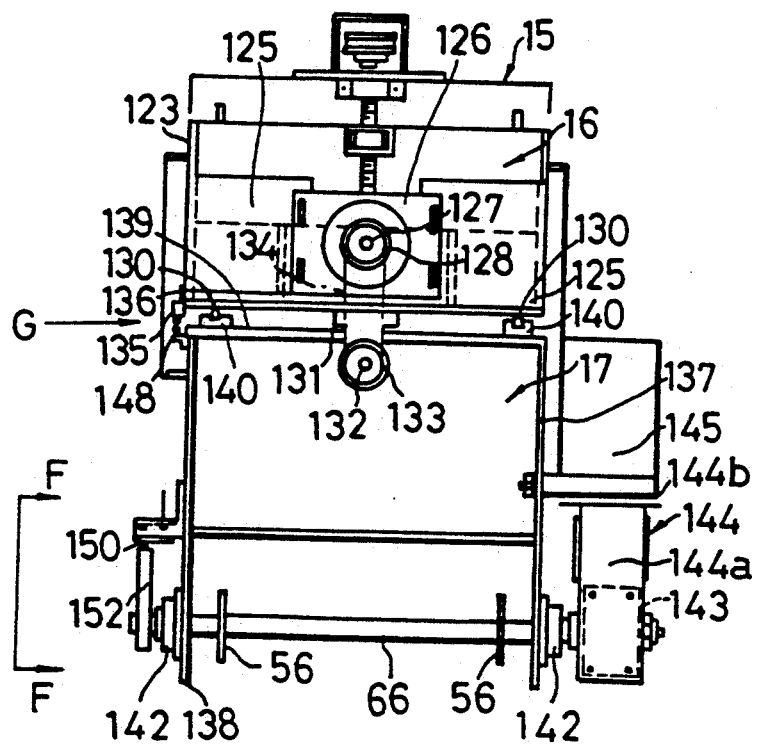
FIG. 15 shows a right side view of the structure shown by FIG. 13.

When the second cut breaker 13a completes the process of its supply and attachment onto the drum 2, the servo motor 145 starts the pivotal shaft 66 to pivot in a direction as shown by Y in FIG. 13 so that the front end of the guide pan apparatus 14 moves upward and comes away from the drum 2, and then stops at a predetermined position. On the other hand, the vertically mobile frame 16 raises and stops at the upper limit point, and the front/rear mobile frame 17 moves forwards and stops at the forward limit point, and the guide pan apparatus 14 is moved to the standby position as shown in two dot lines in FIG. 1.

If supply of the first breaker 12a is considered, first, the servo motor 145 is started and hence the pivotal shaft 66 is pivoted in a direction shown by Z in FIG. 13 so that the front end of the guide pan apparatus 14 comes down to cause the conveyor roller 79 to be close on the belt building drum 2. Thus, the positional condition as shown in solid lines in FIG. 1 is brought about and then the breakers 12a, 13a will restart by the same operations as noted before.

Control of all operations to be performed by each apparatus or device is by a program control system based on computers.

As noted in the embodiment, the positioning means 25 uses the omni rollers 23 and thereby more accurate positional determinations can be made, and hence improvement is obtained in cutting the predetermined length.

This invention is not limited to the above embodiment and obvious modification may be introduced. For instance, the fabric may be cut from steel cord chafer; the transfer apparatus may include three or four levels; the transhipping conveyor 20 may be replaced with the extended second conveyor 19, further sub-guides 64, 65 may be adapted to be synchronised and to move simultaneously with the right and left sides.

In an alternative embodiment, if it is assumed that the guide pan apparatus 14 is only provided with vertical and/or pivotal mobility, it is permitted to extend two brackets from the vertical mobile frame 16 and provide a shaft which extends through the two brackets, and thus, the guide pan apparatus 14 may be made movable about this shaft.

What is claimed is:

1. A green tire manufacturing apparatus comprising:
   unwinding means for unwinding a tire component in web form wound on a reel;
   transfer means for transferring the unwound tire component longitudinally thereof, said transfer means including a first conveyor disposed upstream of the transferring direction and a second conveyor disposed downstream of the same, the first and second conveyors being drivable independently;
   cutter means disposed for cutting the tire component at a predetermined angle slanted against the transferring direction;
   separating means, disposed between the first and second conveyors, for separating a portion of the tire component cut by the cutter means to have a predetermined length and lying downstream, from subsequent portions of the tire component lying upstream, wherein the separating means includes an upstream conveyor sector and a downstream conveyor sector, a conveyor in the upstream sector and a conveyor in the downstream sector being defined by an intermediate line slanted against the transferring direction, said intermediate line being substantially parallel to the cutting line by said cutter means, and
   wherein the conveyors of the upstream and downstream sectors of said separating means include a plurality of rollers of varying lengths and being rotatably supported in a widthwise direction on two opposite sides with respect to the slanted line, and
   wherein each roller of the upstream conveyor sector and each roller of the downstream conveyor sector have a common core shaft, and each pair of rollers of the upstream and downstream sectors is defined by sleeves mounted over the common core shaft;
   the roller sleeves of the upstream conveyor sector are secured to the common core shafts and the roller sleeves of the downstream conveyor sector are loosely mounted over the common core shafts;
   the common core shafts are drive-connected to the first conveyor of the transfer means;
   the roller sleeves of the downstream conveyor sector have different shares in length respectively on the common core shafts, wherein the difference in share between the upstream roller sleeves and the downstream roller sleeves changes gradually along the transferring direction;
   guide pan means for guiding downstream the portion of the tire component cut in a predetermined length and for providing widthwise positioning with the same; and
   green tire building means including a drum for receiving the tire component cut in a predetermined length from said guide pan means and for winding the same on the drum.

2. The green tire manufacturing apparatus as claimed in claim 1, wherein the guide pan means comprises a conveyor for transferring a tire component, said conveyor being provided with guide members which are disposed at two opposite sides on the conveyor, wherein the two opposite guide members are adapted to approach and move away from each other to guide two sides of the tire component body being transferred.

3. The green tire manufacturing apparatus as claimed in claim 2, wherein, in the guide pan means, omni rollers are arranged to define a working conveying surface whereon the tire component is transferred.

4. The green tire manufacturing apparatus as claimed in claim 2, wherein, in front of the guide members, movable sub-guide members are disposed, wherein the sub-guide members are adapted to move laterally such that the sub-guide members retreat from each other on passing of an acute front portion of the tire component to avoid contact with sides thereof, and such that the sub-guide members are positionally adjusted with respect to each other to guide the tire component by contacting sides thereof subsequent to passing of the acute portion.

5. The green tire manufacturing apparatus as claimed in claim 1, wherein:
   the unwinding means comprises a plurality of unwinding apparatus;
   the transfer means are structured vertically to have a plurality of processing levels in response to the number of the unwinding apparatus;
   the guide pan means is adapted at least to be vertically mobile and/or vertically pivotable;
   the guide pan means is provided with a rear end adapted to connect/disconnect to a front end of a second conveyor provided at each level of a vertically structured transfer means, and the guide pan means is provided with a front end disposed adjacent to the green tire building drum.

6. A green tire manufacturing apparatus comprising:
   unwinding means for unwinding a tire component in web form wound on a reel;
   transfer means for transferring the unwound tire component longitudinally thereof, said transfer means including a first conveyor disposed upstream of the transferring direction and a second conveyor disposed downstream of the same, the first and second conveyors being drivable independently of each other;
   cutter means disposed for cutting the tire component at a predetermined angle slanted against the transferring direction;

separating means, disposed between the first and second conveyors, for separating a portion of the tire component cut by the cutter means to have a predetermined length and lying downstream, from subsequent portions of the tire component lying upstream, wherein the separating means comprises an upstream conveyor sector and a downstream conveyor sector, a conveyor in the upstream sector and a conveyor in the downstream sector being defined by an intermediate line slanted against the transferring direction, said intermediate line being substantially parallel to the cutting line by the cutter means, wherein the conveyors of the upstream and downstream sectors of the separating means include plural rollers having varying lengths and being rotatably supported widthwise on two opposite sides with respect to the slanted line, and wherein each roller of the upstream conveyor sector and each roller of the downstream conveyor sector have a common core shaft, and each pair of rollers of the upstream and downstream sectors is defined by sleeves mounted over the common core shaft;

the roller sleeves of the upstream conveyor sector are secured to the common core shafts and the roller sleeves of the downstream conveyor sector are loosely mounted over the common core shafts;

the common core shafts are drive-connected to the first conveyor of the transfer means; and the roller sleeves of the upstream conveyor sector and the roller sleeves of the downstream conveyor sector have different shares in length respectively on the common core shafts, wherein the difference in share between the upstream roller sleeves and the downstream roller sleeves changes gradually along the transferring direction;

guide pan means for guiding downstream the portion of the tire component cut in a predetermined length and for providing widthwise positioning with the same; wherein the guide pan means includes a conveyor for transferring a tire component, said conveyor being provided with guide members which are disposed at two opposite sides on the conveyor, wherein the two opposite guide members are adapted to approach and move away from each other to guide two sides of the tire component body being transferred; and green tire building means including a drum for receiving the tire component cut in a predetermined length from said guide pan means and for winding the same on the drum, wherein, in front of the guide members, movable sub-guide members are disposed, wherein the sub-guide members are adapted to move laterally such that the sub-guide members retreat from each other on passing of an acute front portion of the tire component to avoid contact with sides thereof, and such that the sub-guide members are positionally adjusted with respect to each other to guide the tire component by contacting sides thereof subsequent to passing of the acute portion.

7. The green tire manufacturing apparatus as claimed in claim 6, wherein of the upstream and downstream conveyor sectors of the separating means, rollers of one sector are of drive rotation and rollers of the other sector are of free rotation.

8. The green tire manufacturing apparatus as claimed in claim 6, wherein the rollers of the upstream and downstream conveyor sectors of the separating means are of free rotation.

9. The green tire manufacturing apparatus as claimed in claim 7, wherein the rollers of the upstream conveyor sector of the separating means are of drive rotation in synchronism with the first conveyor, and the rollers of the downstream conveyor sector are of free rotation.

10. The green tire manufacturing apparatus as claimed in claim 6, wherein in the guide pan means, omni rollers are arranged to define a working conveying surface whereon the tire component is transferred.

11. The green tire manufacturing apparatus as claimed in claim 6, wherein the unwinding means comprises a plurality of unwinding apparatus; the transfer means are structured vertically to have a plurality of processing levels in response to the number of the unwinding apparatus; the guide pan means is adapted at least to be vertically mobile and/or vertically pivotable; the guide pan means is provided with a rear end adapted to connect/disconnect to a front end of a second conveyor provided at each level of a vertically structured transfer means, and the guide pan means is provided with a front end disposed adjacent to the green tire building drum.

* * * * *